United States Patent
Elias et al.

(10) Patent No.: US 9,936,008 B2
(45) Date of Patent: Apr. 3, 2018

(54) METHOD AND SYSTEM FOR DYNAMICALLY SHIFTING A SERVICE

(71) Applicant: Red Hat, Inc., Raleigh, NC (US)

(72) Inventors: Filip Elias, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 532 days.

(21) Appl. No.: 14/094,879

(22) Filed: Dec. 3, 2013

(65) Prior Publication Data
US 2015/0156078 A1    Jun. 4, 2015

(51) Int. Cl.
*G06F 15/16* (2006.01)
*H04L 29/08* (2006.01)
*H04L 12/24* (2006.01)
*H04L 29/06* (2006.01)

(52) U.S. Cl.
CPC ...... *H04L 67/1023* (2013.01); *H04L 41/5058* (2013.01); *H04L 67/1008* (2013.01); *H04L 41/5054* (2013.01); *H04L 63/1458* (2013.01)

(58) Field of Classification Search
CPC ............. H04L 67/1023; H04L 41/5058; H04L 67/1008; H04L 63/1458; G06F 8/60; G06F 8/61; G06F 2009/4557
See application file for complete search history.

(56) References Cited

U.S. PATENT DOCUMENTS

| | | | |
|---|---|---|---|
| 6,880,090 B1* | 4/2005 | Shawcross | H04L 12/18 709/225 |
| 7,769,784 B2 | 8/2010 | Chagoly et al. | |
| 8,037,186 B2 | 10/2011 | Dumitriu et al. | |
| 8,539,545 B2* | 9/2013 | Kartha | H04L 63/104 709/223 |
| 9,450,981 B2* | 9/2016 | Doron | H04L 63/1458 |
| 2002/0161925 A1* | 10/2002 | Munger | H04L 61/2007 709/241 |
| 2004/0141616 A1* | 7/2004 | Himmel | H04L 63/0428 380/270 |
| 2006/0195610 A1* | 8/2006 | Cole | H04L 61/2015 709/245 |
| 2008/0098462 A1* | 4/2008 | Carter | G06F 21/33 726/4 |

(Continued)

FOREIGN PATENT DOCUMENTS

| | | |
|---|---|---|
| KR | 20120015784 | 2/2012 |
| WO | WO1999019822 A2 * | 9/1998 |

OTHER PUBLICATIONS

Khattab et al. "Proactive Server Roaiming for Mitigating Denial-of-Service Attacks". IEEE. 2003. pp. 286-290.*

(Continued)

*Primary Examiner* — John Macilwinen
(74) *Attorney, Agent, or Firm* — Haynes and Boone, LLP (57) ABSTRACT

Systems and methods are disclosed for dynamically shifting one or more instances of a service from a first set of servers to a second set of servers. In an embodiment, a system includes a service repository that stores one or more services. The system also includes a deployment manager that deploys a set of instances of a service of the one or more services on a first set of servers and shifts one or more instances of the set of instances to a second set of servers.

20 Claims, 6 Drawing Sheets

(56) References Cited

U.S. PATENT DOCUMENTS

| | | | | |
|---|---|---|---|---|
| 2010/0250746 A1* | 9/2010 | Murase | .................... | G06F 9/50 709/226 |
| 2010/0333188 A1* | 12/2010 | Politowicz | .......... | H04L 63/1441 726/13 |
| 2013/0014127 A1 | 1/2013 | Kukreja et al. | | |
| 2013/0298236 A1* | 11/2013 | Smith | ................ | H04L 63/1491 726/23 |

OTHER PUBLICATIONS

Ranjan et al. "QoS-Driven Serer Migration for Internet Data Centers". IEEE. 2002. pp. 3-12.*

Sherif Khattab et al., Honeypot Back-propagation for Mitigating Spoofing Distributed Denial-of-Service Attacks, 2006, vol. 66, pp. 1152-1164, Journal of Parallel and Distributed Computing, Department of Computer Science, University of Pittsburg, PA, 15260, USA, 2006 Elsevier, Inc.

Chunqiang Tang et al., A Distributed Service Management Infrastructure for Enterprise Data Centers Based on Peer-to-Peer Technology; 2006, 8 pages, IBM Thomas J. Watson Research Center, IEEE International Conference on Services Computing (SCC'06), 2006 IEEE.

Erik Nordstrom et al., Serval: An End-Host Stack for Service-Centric Networking, Princeton University, 14 pages.

Martin Casado et al., Sane: A Protection Architecture for Enterprise Networks; 15$^{th}$ USENIX Security Symposium, pp. 137-151 (25 pages) of the proceedings.

* cited by examiner

METHOD AND SYSTEM FOR DYNAMICALLY SHIFTING A SERVICE

BACKGROUND

The present disclosure generally relates to providing services, and more particularly to shifting instances of a service.

A service may be accessible over a network to accept and process client requests. The service may be a critical service that needs to be online and ready to accept and process client requests at any time. An attacker (e.g., a person or malicious software) may attempt to deliberately overload or congest the service to put it out of order. It may be difficult to protect the service from such an attacker because the attacker may congest the whole server on which the service is deployed.

A conventional solution is to authenticate the attacker. An authentication, however, may be unhelpful because the attacker may congest the service using login requests. Another convention solution is to detect suspicious activity. For example, traffic filtering and/or firewalls may be used to analyze a network to detect suspicious traffic and block it. This solution, however, may be unreliable because it may not reliably distinguish traffic that is malicious and traffic that is not malicious (e.g., from legitimate customers). Further, the filtering device may also be overloaded. This solution may be unhelpful for situations in which the service is a critical service because a customer's request may be filtered by the protection filter and may not arrive to the critical service in a timely manner.

BRIEF SUMMARY

This disclosure relates to providing services. Methods, systems, and techniques for dynamically shifting instances of a service are provided.

According to an embodiment, a system for dynamically shifting one or more instances of a service from a first set of servers to a second set of servers includes a service repository that stores one or more services. The system also includes a deployment manager that deploys a set of instances of a service of the one or more services on a first set of servers and shifts one or more instances of the set of instances to a second set of servers.

According to another embodiment, a method of dynamically shifting one or more instances of a service from a first set of servers to a second set of servers includes deploying a set of instances of the service on a first set of servers. The method also includes shifting one or more instances of the set of instances to a second set of servers.

According to another embodiment, a non-transitory machine-readable medium includes a plurality of machine-readable instructions that when executed by one or more processors are adapted to cause the one or more processors to perform a method including: deploying a set of instances of the service on a first set of servers; and shifting one or more instances of the set of instances to a second set of servers.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architecture
  A. Deploy an Instance on a Server
  B. Shift an Instance to Another Server
  C. Suspect Attack
III. Example Method
IV. Example Computing System

I. OVERVIEW

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A service deployed on a set of servers may be vulnerable to service attacks (e.g., a denial of service attack or a distributed denial of service attack). It may be desirable to shield such an attack by, for example, dynamically shifting one or more instances of the service deployed on a first subset to a second subset of servers. In an example, a set of servers may be registered as candidate hosts for the service. A candidate host may refer to a computing device (e.g., server) that may host the service. In an example, a set of servers {S1, S2, S3, S4, S5, S6} may be registered as members of a service shifting group that are candidate hosts for a particular service, and a set of instances of the service may be deployed on a first subset {S1, S2, S3} of the set of servers {S1, S2, S3, S4, S4, S5, S6}. In the present disclosure, a subset of servers may also refer to a set of servers. It may be advantageous to dynamically shift one or more of these instances deployed on the first subset to a second subset (e.g., {S4, S5, S6, S7}) of the set of servers {S1, S2, S3, S4, S4, S5, S6}.

For example, a particular instance that is deployed on server S1 may be shifted to server S5. In such an example, even if the attacker attempts to overload the service by attacking servers S1, S2, and S3 of the first subset, the attacker would also need to attack server S5 of the second subset after the particular instance is shifted from server S1 to server S5. Accordingly, it may be difficult for the attacker to continue to attack the service when instances of the service are being shifted elsewhere. The shifting of the instances may appear to be unpredictable to the attacker. In this way, the service may "hide" from the attacker. To successfully attack the service and put it out of order, the attacker may need to overload all the servers in the service shifting group, which may include hundreds of servers.

The present disclosure provides a system, method, and technique of dynamically shifting one or more instances of a service from a first subset of servers to a second subset of servers. In an embodiment, a system for dynamically shifting one or more instances of a service from a first subset of servers to a second subset of servers includes a service repository that stores one or more services. The system also includes a deployment manager that deploys a set of instances of a service on a first subset of servers and shifts one or more instances of the set of instances to a second subset of servers.

II. EXAMPLE SYSTEM ARCHITECTURE

Figure 1:
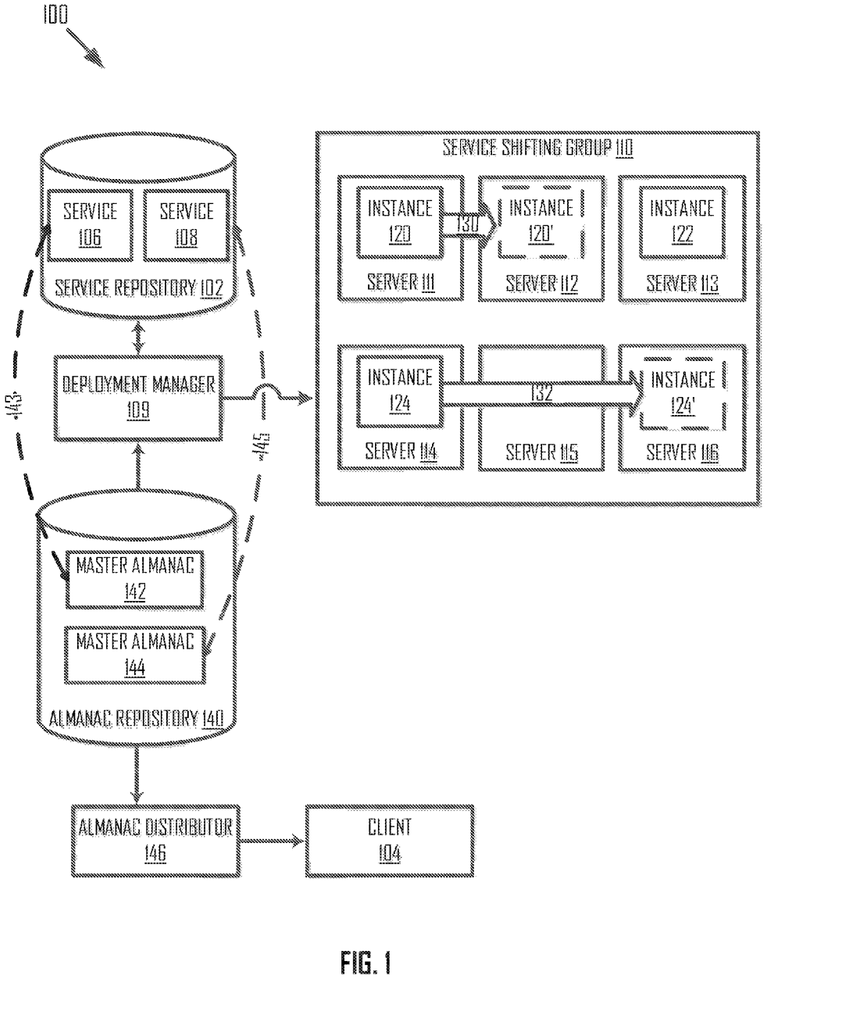
FIG. 1 is a simplified block diagram illustrating a system for dynamically shifting one or more instances of a service from a first subset of servers to a second subset of servers, according to an embodiment.

FIG. 1 is a simplified block diagram 100 illustrating a system for dynamically shifting one or more instances of a service from a first subset of servers to a second subset of servers, according to an embodiment. Diagram 100 includes a service repository 102 and client 104. Service repository 102 stores one or more services that may be deployed on a server and accessed by a client 104. In FIG. 1, service repository 102 stores services 106 and 108. A service may refer to a software component that is able to accomplish a task. In an example, the service may be an enterprise service that accomplishes a task. An instance of a service (e.g., enterprise service) may be deployed on a given server, and client 104 may send requests to the service by sending them to the server. The service may receive the request via the server, process the request, and return a response to the request to client 104.

A. Deploy an Instance on a Server

Diagram 100 also includes a deployment manager 109 and service shifting group 110. Deployment manager 109 may register one or more servers as members of a service shifting group. A service shifting group includes candidate hosts for a service. An administrator may register a server as a member of the service shifting group via deployment manager 109. In an example, service shifting group 110 includes a set of servers including servers 111, 112, 113, 114, 115, and 116 that have been registered as members of a service shifting group that are candidate hosts for service 106. A server that is a member of service shifting group 110 may host service 106.

Servers 111, 112, 113, 114, 115, and 116 may be connected over a network. Although service shifting group 110 includes six servers, a service shifting group may include any quantity of servers greater than one. In another example, a service shifting group includes hundreds of servers. Further, although one service shifting group is illustrated, other embodiments including more than one service shifting group are within the scope of the present disclosure. For example, another service shifting group may include another set of servers that have been registered as members of a service shifting group that are candidate hosts for another service (e.g., service 108). A server may be registered as a member of more than one service shifting group.

In an embodiment, deployment manager 109 deploys a set of instances of a service stored in service repository 102. Deployment manager 109 may deploy the set of instances on a subset of servers in service shifting group 110. In an example, deployment manager 109 deploys a set of instances 120, 122, and 124 of service 106 on a first subset of service shifting group 110, which includes servers that are candidate hosts for service 106. In particular, deployment manager 109 may deploy instance 120 on server 111, instance 122 on server 113, and instance 124 on server 114. Accordingly, service 106 may be accessible to one or more clients 104 via servers 111, 113, and 114, respectively, for processing tasks.

B. Shift an Instance to Another Server

Deployment manager 109 may dynamically shift one or more of these instances from the first subset of servers to a second subset of servers in service shifting group 110. In an embodiment, deployment manager 109 uses a master almanac to determine on which server(s) to deploy a service and when to shift instances of the service to other servers. Shifting an instance deployed on a server to another server may be advantageous because it may avoid overloading of the service. Accordingly, the service may be concealed from an attacker so that the attacker is unable to locate the service. The techniques used in the disclosure may be used to prevent deliberate overloading or congestion of services.

Diagram 100 includes an almanac repository 140 and almanac distributor 146. Almanac repository 140 stores one or more master almanacs, and almanac distributor 146 assigns a master almanac to a service. In FIG. 1, almanac repository 140 stores master almanacs 142 and 144, and almanac distributor 310 may assign master almanac 142 to service 106 and may assign master almanac 144 to service 108, as indicated by the dashed arrows 143 and 145, respectively. Deployment manager 109 may periodically shift, based on the master almanac assigned to a particular service, instances of the particular service from an initial subset of servers to a new subset of servers. Almanac distributor 146 may distribute the master almanacs that have been assigned to a particular service to clients registered with that particular service. The master almanac may be in the form of a file or text information.

In an embodiment, deployment manager 109 determines whether a condition is satisfied. When the condition is determined to be satisfied, deployment manager 109 may shift one or more instances from a set of servers to another set of servers in service shifting group 110. In an example, a master almanac is associated with one or more conditions and deployment manager 109 determines whether a condition associated with the master almanac is satisfied. In such an example, the master almanac may include one or more records, where a record may indicate one or more conditions that shifts one or more instances of a service from the initial subset of servers to the new subset of servers. When the condition is determined to be satisfied, deployment manager 109 may shift one or more instances of a service to which the master almanac is assigned from an initial subset to a new subset of servers. When the attacker determines the new subset of servers on which the service is deployed and deliberately congests these servers, the service may be shifted to another new subset of services (e.g., after a short time interval). Clients may use the master almanac assigned to a service to determine the location of the new subset of servers on which the service is deployed. Accordingly, clients may use the master almanac to determine the current location of the service at any given time.

Figure 2:
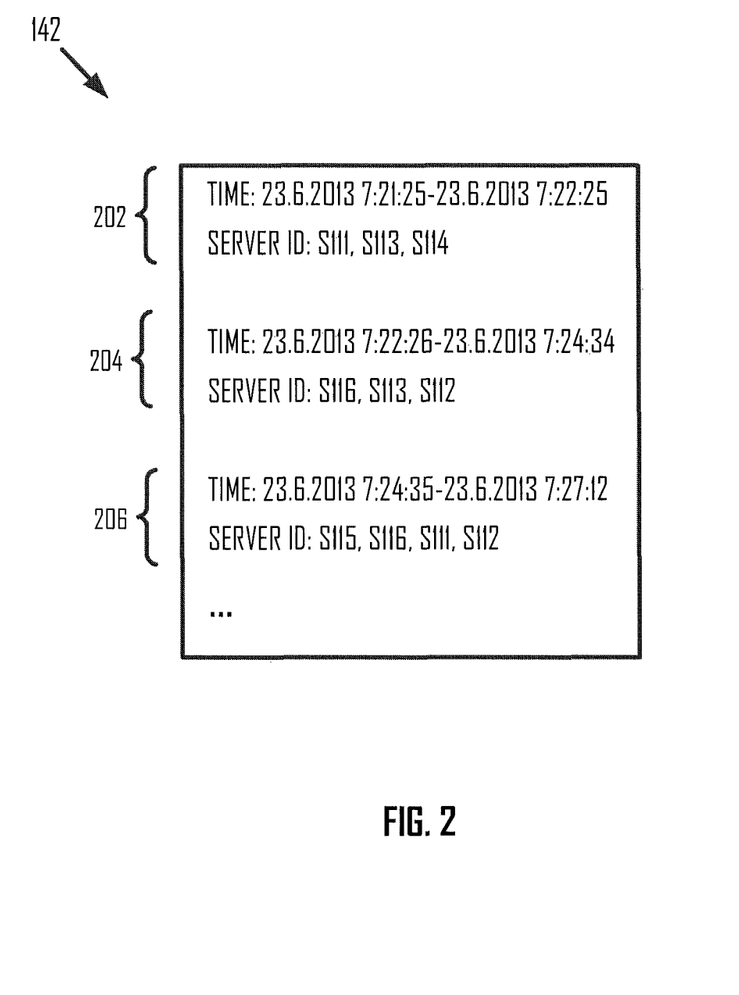
FIG. 2 is an example of a master almanac, according to an embodiment.

FIG. 2 is an example of master almanac 142, according to an embodiment. A master almanac may include information about future service locations for a service to which the master almanac is assigned. In FIG. 2, master almanac 142 includes records 202, 204, and 206, and each record includes a time interval and a set of server identifiers (IDs). The set of server IDs is a subset of service shifting group 110. The server ID for server 111 may be "S111", the server ID for server 112 may be "S112", the server ID for server 113 may be "S113", the server ID for server 114 may be "S114", the server ID for server 115 may be "S115", and the server ID for server 116 may be "S116." The time interval identifies when a service will be deployed on particular servers identified by the set of server IDs and for how long the service will be accessible via the particular servers. Accordingly, master almanac 142 may include information regarding which subset of servers of service shifting group 110 hosts a service for a given time interval.

Deployment manager 109 may read the records in master almanac 142 to determine on which servers to deploy service 106 and for how long. In an example, deployment manager 109 identifies from master almanac 142 a time interval during which a set of instances is deployed on an initial subset of servers and may also identify from master almanac 142 the new subset of servers on which to deploy the one or more instances when the condition is satisfied. In such an example, when the time interval has elapsed, the condition is satisfied and deployment manager 109 shifts the instances from the initial subset of servers to the new subset of servers.

In FIG. 2, first record 202 in master almanac 142 includes a first time interval, "23.6.2013 7:21:25-23.6.2012 7:22:25," and a first subset of server IDs, S111, S113, and S114. A start of the first time interval may indicate a time at which instances of service 106 are available on the first subset of servers identified in the first subset of server IDs in record 202. The first time interval indicates a duration of time in which the service remains deployed on the first subset of servers, which is from 7:21:25 A.M. to 7:22:25 A.M. on Jun. 6, 2012. In an example, if client 104 desires to use service 106 on Jun. 6, 2013 at 7:22:05 A.M., client 104 may determine the current location(s) of service 106 by checking master almanac 142 and send a request to servers 111, 113, and/or 114. To ensure that the service is available via the first subset of servers at the start of the time interval, deployment manager 109 may start the process of deploying instances of the service on the first subset of servers before the start of the time interval. For example, if the process of successfully deploying a service takes N seconds, deployment manager 109 may start the deployment process approximately N seconds before the start of the time interval. Thus, deployment manager 109 may deploy the service on a new subset of servers slightly sooner than the time indicated in the time interval. An administrator may configure the deviation. When the time interval has elapsed, the condition may be satisfied and deployment manager 109 may shift one or more instances deployed on the first subset of servers to the new subset of servers. In an example, deployment manager 109 may compare the end time in the time interval with the current time. In such an example, if the latest time in the time interval is greater than or equal to the current time, the condition has been satisfied. When the current time is more recent than the end time in the time interval, the end time in the time interval may be considered greater than the current time.

Second record 204 includes a second time interval, "23.6.2013 7:22:26-23.6.2012 7:24:34," and a second subset of server IDs, S116, S113, and S112. Deployment manager 109 may process second record 204 by deploying instances of service 106 on a second subset of servers identified in the second subset of server IDs and making service 106 available to clients on the second subset of servers during the second time interval, which is from 7:22:26 A.M. to 7:24:34 A.M. on Jun. 6, 2012. As such, when client 104 desires to use service 106 during the second interval, client 104 may send its requests to a server of the second subset (e.g., servers 116, 113, and 112) rather than servers of the first subset that are also not listed in the second subset (e.g., servers 111 and 114). The servers of the second subset may begin to receive requests from clients for service 106 during the second time interval, process them, and return responses to the requests to the clients.

In FIG. 1, the first subset of service shifting group 110 on which instances of service 106 are deployed includes servers 111, 113, and 114. In particular, instance 120 is deployed on server 111, instance 122 is deployed on server 113, and instance 124 is deployed on server 114. Further, an arrow 130 associated with instance 120 indicates that deployment manager 109 may shift instance 120 from server 111 to server 112, and an arrow 132 associated with instance 124 indicates that deployment manager 109 may shift instance 124 from server 114 to server 116. Accordingly, during the second time interval, instance 120 is deployed on server 112, instance 122 remains deployed on server 113, and instance 124 is deployed on server 116.

The following is a description of instance 120. This description applies as well to other instances of a service. Deployment manager 109 may shift instance 120 deployed on server 111 to server 112 by deploying an instance 120' to server 112 and undeploying instance 120 from server 111. Before deployment manager 109 undeploys instance 120 from server 111, deployment manager 109 may determine whether instance 120 has any more requests to process. For example, instance 120 may be in the process of processing a request for client 104 when the condition that shifts instance 120 is satisfied (e.g., the first time interval has elapsed). Deployment manager 109 may determine whether instance 120 has completed processing its requests. If instance 120 has not yet finished processing its requests, deployment manager 109 may wait for instance 120 to complete processing its requests, ensuring that no requests are lost. Similarly, deployment manager 109 may shift instance 124 deployed on server 114 to server 116 by deploying an instance 124' to server 116 and undeploying instance 124 from server 114.

Deployment manager 109 may send instance 120 a communication that causes instance 120 to send to deployment manager 109 a communication indicating whether it has completed all of its requests. In an example, if deployment manager 109 receives an indication that instance 120 has not finished processing its requests, deployment manager 109 may wait for a particular time interval and then send another communication that causes instance 120 to send to deployment manager 109 a communication indicating whether it has completed all of its requests. In another example, instance 120 may not respond to the communication until after it has finished processing all of its requests.

When it is determined that instance 120 has completed processing its requests, deployment manager 109 may undeploy instance 120 from server 111. Thus, deployment manager 109 may undeploy the service from the current subset of servers slightly later than listed in the time interval.

Accordingly, a time period in which the service is deployed on the first subset of servers may overlap with a time period in which the service is deployed on the second subset of servers.

Third record 206 includes a third time interval, "23.6.2013 7:24:35-23.6.2012 7:27:12," and a third subset of server IDs, S116, S115, S111, and 5112. The quantity of instances deployed during the third time interval is greater than the quantity of instances deployed during the second time interval. In another example, the quantity of instances deployed during the third time interval may be fewer than the quantity of instances deployed during the second time interval. Accordingly, the quantity of instances of a service that is deployed may increase or decrease relative to the previous quantity of instances that was deployed in an earlier time interval. Deployment manager 109 may process third record 206 by deploying instances of service 106 on a third subset of servers identified in the third subset of server IDs and making service 106 available to clients on the third subset of servers during the third time interval, which is from 7:24:35 A.M. to 7:27:12 A.M. on Jun. 6, 2012. As such, when client 104 desires to use service 106 during the third interval, client 104 may send its requests to a server of the third subset (e.g., servers 116, 115, 111, and 112) rather than servers of the second subset that are also not listed in the third subset (e.g., servers 113). The servers of the third subset may begin to receive requests from clients for service 106 during the third time interval, process them, and return responses to the requests to the clients.

In an embodiment, deployment manager 109 obtains the master almanacs from a third party. In another embodiment, deployment manager 109 creates the master almanacs. In such an embodiment, deployment manager 109 may randomly select a new subset of servers on which the service is deployed and/or to which instances of service 106 are shifted and may include the new subset of servers in a record of the master almanac. Deployment manager 109 may also determine the time interval during which the service is to be deployed on and accessible via the new subset of servers, and include the time interval in the record of the master almanac. Deployment manager 109 may create one or more records for the master almanac.

In an example, deployment manager 109 stores a server ID associated with each server of service shifting group 110 in an array with indices. The server ID for server 111 may be "S111", the server ID for server 112 may be "S112", the server ID for server 113 may be "S113", the server ID for server 114 may be "S114", the server ID for server 115 may be "S115", and the server ID for server 116 may be "S116." An array "serverArray" may have a length equal to the quantity of servers in service shifting group 110, where serverArray[0]="S111", serverArray[1]="S112", serverArray[2]="S113", serverArray[3]="S 114", serverArray[4]="S115", serverArray[5]="S116", and serverArray[6]="S117". Deployment manager 109 may randomly generate a number between zero and the length of the array minus one. In an example, the server that is identified by the server ID at the index corresponding to the randomly generated number may be selected as a server to which to shift an instance of service 106. Accordingly, the selected server to which an instance is shifted may be the same as or different from the server on which the instance is initially deployed. Other techniques may be used to randomly select the server to which to shift an instance of service 106.

In another example, the condition may be satisfied when a threshold number of requests has been sent to an instance (e.g., within a time interval). In such an example, deployment manager 109 may maintain a sliding window for the time interval and track how many requests have been sent to each instance within that time interval. For example, deployment manager 109 may shift instance 120 deployed on server 111 to server 112 if instance 120 has been sent at least the threshold number of requests within a time interval. This may be used as a cautious measure to avoid attacks on the service. Deployment manager 109 may also shift other instances (e.g., instances 122 and/or 124) other than instance 120 when the condition is satisfied. For example, based on a threshold quantity of requests being sent to instance 120, deployment manager 109 may determine that an attacker is attempting to overload service 106. Accordingly, when the threshold number of requests has been sent to instance 120 within the time interval, deployment manager 109 may shift instance 120 and instances 122 and/or 124 to another server.

C. Suspect Attack

If an attacker has a copy of the master almanac, the attacker may attack the subset of servers identified by the server IDs during each specified time interval. As such, it may be advantageous to send clients modified versions of the master almanac such that no modified versions include all of the details in the master almanac.

Figure 3:
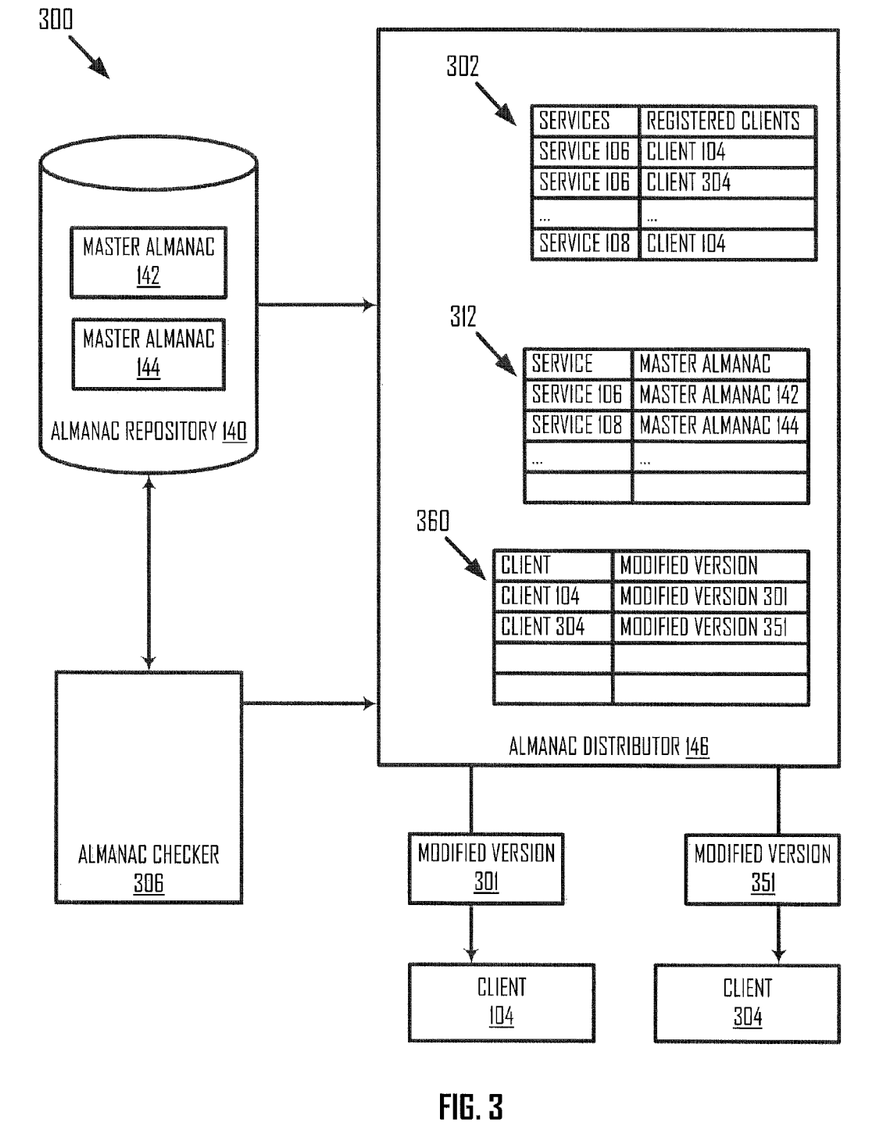
FIG. 3 is a block diagram illustrating a system for detecting a compromised master almanac, according to an embodiment.

FIG. 3 is a block diagram 300 illustrating a system for detecting a compromised master almanac, according to an embodiment. Diagram 300 includes almanac repository 140 and almanac distributor 146. In an embodiment, almanac distributor 146 maintains a client registry 302 that stores a list of clients registered with a service. Almanac distributor 146 may identify a list of clients registered with the service. The entries in client registry 302 indicate that clients 104 and 304 are registered with service 106 and that client 104 is registered with service 108. In an example, the client registers with an IP address that is assigned to the client. In such an example, the client may be represented by its assigned IP address. The client may register with a service via any server that is a member of service shifting group 110. In an example, the client may be unable to directly register with almanac distributor 146 so as to prevent an attacker from disabling almanac distributor 146 and thus the servers in service shifting group 110. In another example, the client may be able to directly register with almanac distributor 146. In another example, the client may be able to register with a service via a server that is not a member of service shifting group 110. After almanac distributor 146 authenticates the client, almanac distributor 146 sends the authenticated client an almanac that the client may use to determine the current location of a service.

Almanac distributor 146 also maintains a master almanac assignment registry 312 that stores data on which master almanacs have been assigned to which services. The entries in assignment registry 312 indicate that master almanac 142 has been assigned to service 106 and that master almanac 144 has been assigned to service 108. Almanac distributor 146 may assign a master almanac to a service. Almanac distributor 146 identifies a master almanac to which a service is assigned and sends a modified version of the master almanac to a client registered with the service. In an embodiment, almanac distributor 146 sends different modified versions of the master almanac to the clients registered with the service. In such an embodiment, each client that is registered with a service may have a slightly different almanac. In an example, almanac distributor 146 may send a first modified version 301 of master almanac 142 to client 104 and a second modified version 351 of master almanac 142 to client 304, where the first and second modified versions of master almanac 142 are different. Almanac distributor 146 assigns a modified version of the master almanac to the client that was sent the modified version. For example, almanac distributor 146 may maintain a client assignment table 360 that includes an association between a client and the modified version of a master almanac that was sent to the client. Client assignment table 360 indicates that modified version 301 of master almanac 142 was sent to client 104 and modified version 351 of master almanac 142 was sent to client 304.

In an embodiment, almanac distributor 146 modifies master almanac 142 by removing one or more server IDs listed in one or more entries of master almanac 142. As such, the client is knowledgeable of only a subset of servers on which the service is deployed. Further, almanac distributor 146 may also modify master almanac 142 by slightly shortening or extending the listed time interval in one or more records of master almanac 142. If one time interval is shortened then the following time interval may be extended. Likewise, if one time interval is extended then the following time interval may be shortened.

Figure 4A:
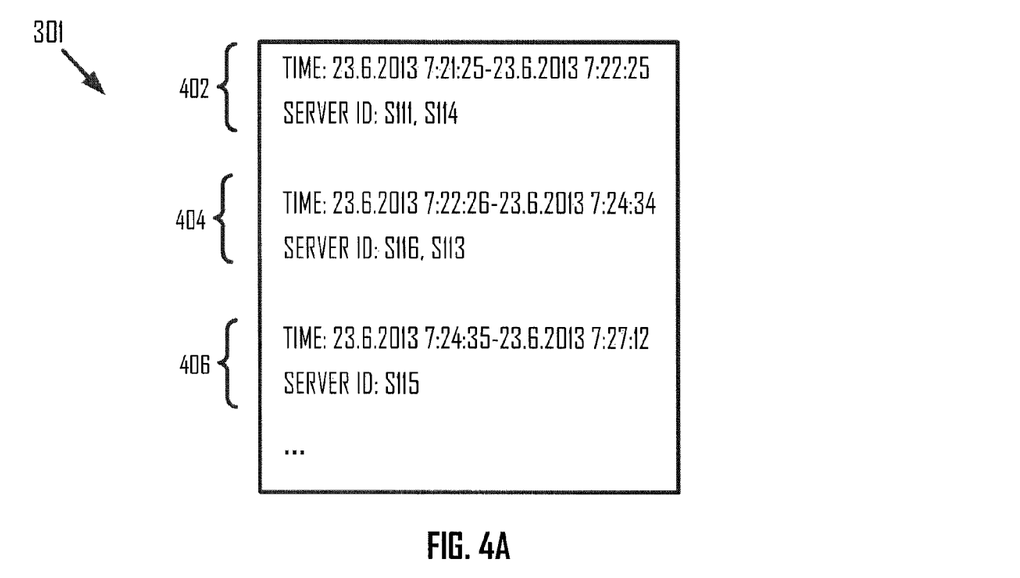
FIG. 4A is an example of a first modified version of a master almanac sent to a client, according to an embodiment.

FIG. 4A is an example of the first modified version of master almanac 142 sent to client 104, according to an embodiment. In FIG. 4A, a first modified version 301 of the master almanac includes records 402, 404, and 406, which correspond to entries 202, 204, and 206 of master almanac 142, respectively. Each of records 402, 404, and 406 includes a time interval and a set of server IDs. The set of server IDs in record 402 is a subset of the set of server IDs in record 202. In particular, the set of server IDs in record 402 includes server IDs S111 and S114, and the set of server IDs in record 202 includes server IDs 5111, S113, and S114. Similarly, the set of server IDs in record 404 is a subset of the set of server IDs in record 204. In particular, the set of server IDs in record 404 includes server IDs S116 and S113, and the set of server IDs in record 204 includes server IDs S116, S113, and S112. Similarly, the set of server IDs in record 406 is a subset of the set of server IDs in record 206. In particular, the set of server IDs in record 406 includes server ID S115, and the set of server IDs in record 206 includes server IDs S115, S116, S111, and S112.

Figure 4B:
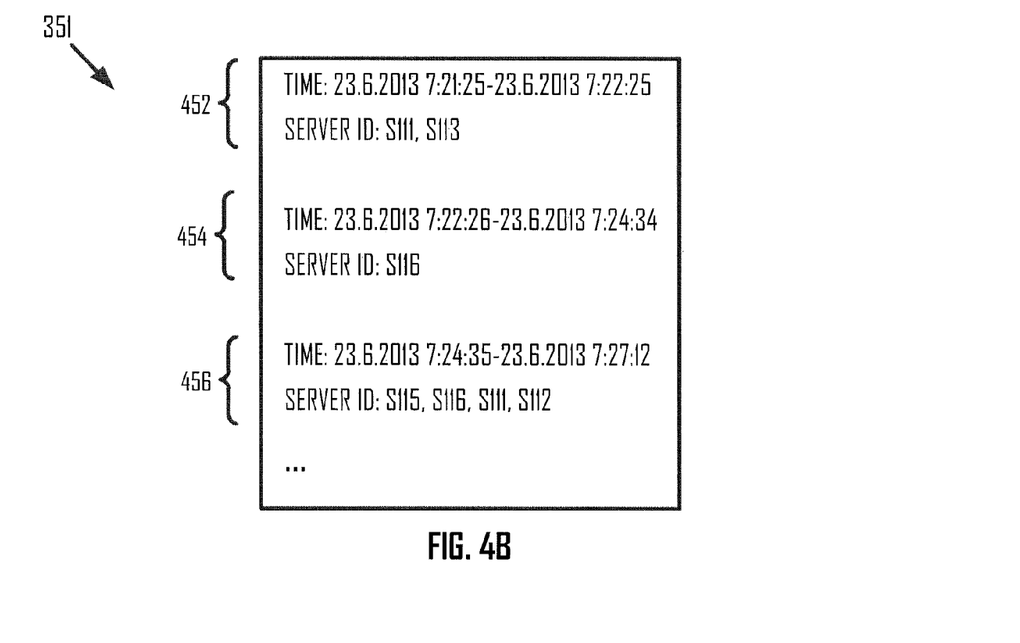
FIG. 4B is an example of a second modified version of the master almanac sent to another client, according to an embodiment.

FIG. 4B is an example of the second modified version of master almanac 142 sent to client 304, according to an embodiment. In FIG. 4B, a second modified version 351 of the master almanac includes records 452, 454, and 456, which correspond to entries 202, 204, and 206 of master almanac 142, respectively. Each of records 452, 454, and 456 includes a time interval and a set of server IDs. The set of server IDs in record 452 is a subset of the set of server IDs in record 202. In particular, the set of server IDs in record 452 includes server IDs S111 and S113, and the set of server IDs in record 202 includes server IDs S111, S113, and S114. Similarly, the set of server IDs in record 454 is a subset of the set of server IDs in record 204. In particular, the set of server IDs in record 454 includes server ID S116, and the set of server IDs in record 204 includes server IDs S116, S113, and S112. The set of server IDs in record 456 includes the same set of server IDs that is in record 206. In particular, the set of server IDs in record 456 includes server ID S115, S116, S111, and S112, and the set of server IDs in record 206 includes server IDs S115, S116, S111, and S112.

The clients that are sent the modified versions of the master almanac may access a service by sending one or more requests to the servers identified in the subset of server IDs for the specified time period in their received modified versions. As such, during the time interval 7:21:25 to 7:22:25 on Jun. 6, 2013, client 104 may access service 106 by sending requests to servers 111 and 114, and client 304 may access service 106 by sending requests to servers 111 and 113. Client 104 may be unaware that service 106 is accessible via server 113, and client 304 may be unaware that service 106 is accessible via server 114.

Referring back to FIG. 3, almanac checker 306 may detect a master almanac that has been revealed to an attacker. To detect a compromised master almanac, almanac checker 302 may leverage the fact that different modified versions of master almanacs have been sent to clients. In an embodiment, almanac checker 306 detects one or more servers overloaded during one or more time intervals and creates a dummy almanac based on the detected one or more servers overloaded during the one or more time intervals. Almanac checker 306 may detect that a server is overloaded based on, for example, the load on the central processing unit of the server or that the server is down. The dummy almanac may include which servers were overloaded during which time intervals. In an example, almanac checker 306 may detect that servers 111 and 113 have been overloaded from 7:21:28 A.M. to 7:22:23 A.M. on Jun. 23, 2013, and may include this information in the dummy almanac. Almanac checker 306 may then detect that server 116 has been overloaded from 7:23:28 A.M. to 7:24:33 A.M. on Jun. 23, 2013, and may also include this information in the dummy almanac.

Almanac checker 306 may be unable to immediately determine which master almanac has been compromised. In an example, to determine which master almanac has been compromised, almanac checker 306 compares the dummy almanac with each of the modified versions of master almanacs that were sent to clients. Almanac checker 306 may go through the modified versions of master almanacs assigned to all services and that were sent to all clients and compare these modified versions with the dummy almanac. Almanac checker 306 identifies a plurality of modified versions of master almanacs that were sent to clients and compares the dummy almanac with the plurality of modified versions of master almanacs that were sent to clients. Because the clients were sent different versions of a master almanac, almanac checker 306 may be able to determine which modified version is most likely in the hands of an attacker.

Almanac checker 306 identifies, based on the comparison, a modified version of a suspect master almanac, where the identified modified version has a highest degree of similarity to the dummy almanac. In keeping with the above example, almanac checker 306 may determine that the dummy almanac has a highest degree of similarity to modified version 351 of master almanac 142 and determine that modified version 351 is in the hands of an attacker. Accordingly, modified version 351 is a modified version of master almanac 142, which may be considered a suspect master almanac. Almanac checker 306 may invalidate the suspect master almanac. When a master almanac assigned to a service has been invalidated, deployment manager 109 may no longer use that master almanac to determine on which servers to deploy an instance of the service.

Almanac checker 306 may identify the suspect service to which the suspect master almanac is assigned and obtain a new master almanac that indicates one or more new conditions that shifts one or more instances of the service to another set of servers. A new condition may include a new time interval different from a time interval in the invalidated suspect master almanac and/or a new subset of server IDs different from the subset of server IDs in the invalidated suspect master almanac. Almanac checker 306 assigns the new master almanac to the suspect service. In an example, almanac distributor 146 obtains the new master almanac from a third party. In another example, almanac distributor 146 randomly selects the subsets of servers in service shifting group 110 to include in the modified versions of the master almanac. Almanac checker 306 identifies the suspect client associated with the modified version of the suspect master almanac. Almanac checker 306 sends a modified version of the new master almanac to a set of clients registered with the suspect service, where the set of clients does not include the suspect client. In an example, almanac checker 306 maintains a list of the IP address of each of the registered clients and sends the new master almanac to each IP address on the list except for the IP address associated with the suspect client. Accordingly, the suspect client may continue to attack the servers associated with the invalidated suspect master almanac without knowledge that a new master almanac exists. Clients may receive the modified versions of the new master almanac and use the new modified versions to determine the current location of the service.

Each of service repository 102, deployment manager 109, almanac distributor 146, almanac repository 140, client 104, almanac checker 306, and the servers in service shifting group 110 may be coupled over a network (not shown). The network may include various configurations including the Internet, World Wide Web, intranets, virtual private networks, wide area networks, local networks, private networks using communication protocols such as protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

As discussed above and further emphasized here, FIGS. 1-3, 4A, and 4B are merely examples, which should not unduly limit the scope of the claims. For example, it should be understood that one or more components (e.g., deployment manager 109, almanac distributor 146, and almanac checker 306) may be combined with another component. In an example, almanac distributor 146 and almanac checker 306 are combined into one component. It should also be understood that a component may be separated into more than one component.

III. EXAMPLE METHOD

Figure 5:
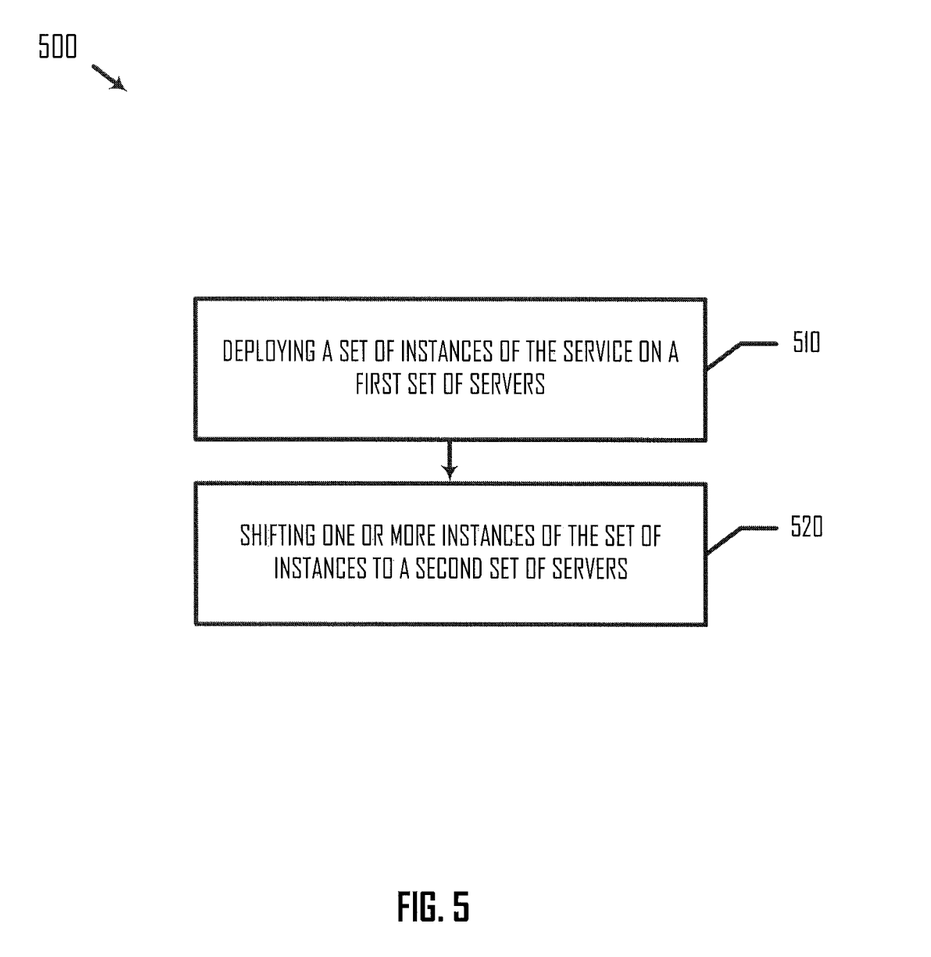
FIG. 5 is a simplified flowchart illustrating a method of dynamically shifting one or more instances of a service from a first set of servers to a second set of servers, according to an embodiment.

FIG. 5 is a simplified flowchart illustrating a method 500 of dynamically shifting one or more instances of a service from a first set of servers to a second set of servers, according to an embodiment. Method 500 is not meant to be limiting and may be used in other applications.

Method 500 includes blocks 510-520. In a block 510, a set of instances of the service is deployed on a first set of servers. In an example, deployment manager 109 deploys instances 120, 122, and 124 of service 106 on servers 111, 113, and 114, respectively. In a block 520, one or more instances of the set of instances is shifted to a second set of servers. In an example, deployment manager 109 shifts instances 120 and 124 from servers 111 and 114 to servers 112 and 116, respectively.

It is also understood that additional processes may be inserted before, during, or after blocks 510-520 discussed above. It is also understood that one or more of the blocks of method 500 described herein may be omitted, combined, or performed in a different sequence as desired.

IV. EXAMPLE COMPUTING SYSTEM

Figure 6:
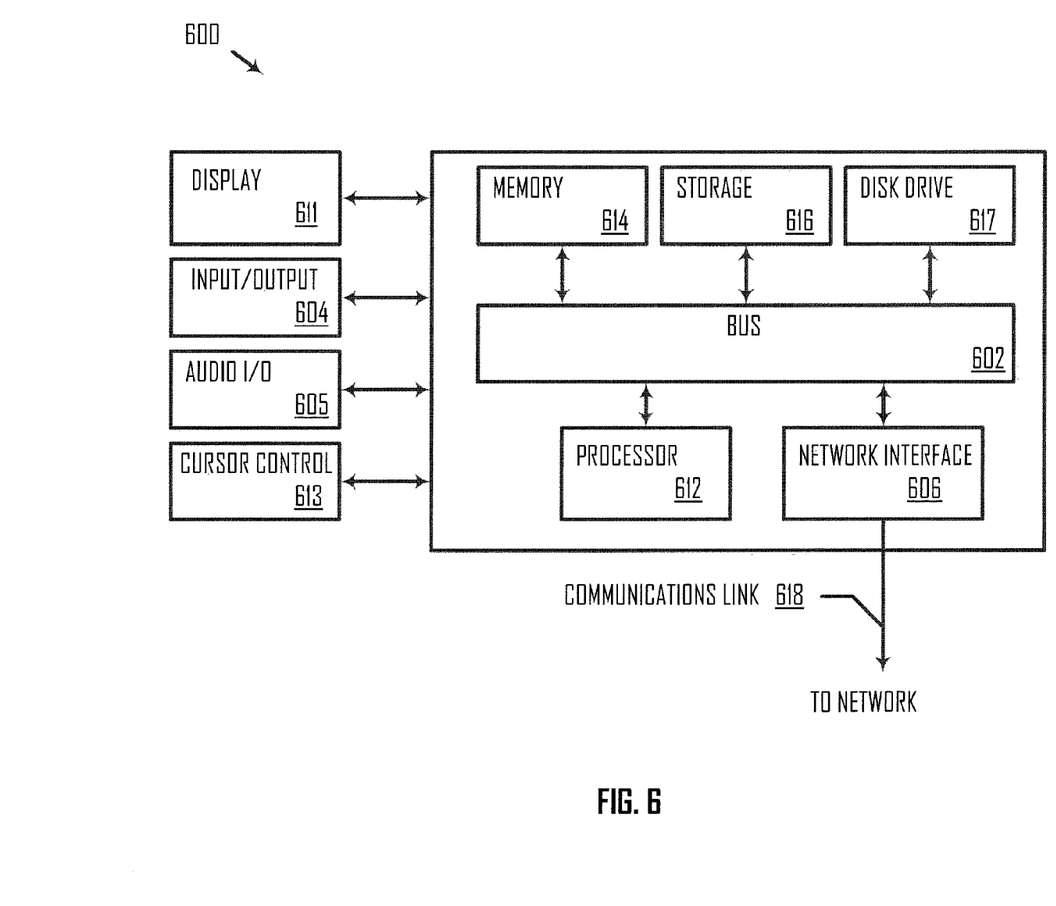
FIG. 6 is a block diagram of an electronic system suitable for implementing one or more embodiments of the present disclosure.

FIG. 6 is a block diagram of a computer system 600 suitable for implementing one or more embodiments of the present disclosure. Each of deployment manager 109, almanac distributor 146, client 104, and almanac checker 306 may execute on a computing device. The computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a microcontroller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A system for dynamically shifting one or more instances of a service from a first set of servers to a second set of servers, comprising:
   a non-transitory memory; and
   one or more hardware processors coupled to the non-transitory memory and configured to read instructions from the non-transitory memory to cause the system to perform operations comprising:
      deploying a set of instances of a service on a first set of servers;
      assigning a master almanac to the service, the master almanac including a first record and a second record, the first record including a first time interval specifying when the set of instances will be deployed on the first set of servers, and the second record including a second time interval specifying when the set of instances will be deployed on a second set of servers;
      distributing the master almanac to a list of clients registered with the service, the list of clients including a first client and a second client;
      shifting, based on the master almanac, the set of instances of the service from the first set of servers to the second set of servers;
      sending a first modified version of the master almanac to the first client and sending a second modified version of the master almanac to the second client, wherein the first modified version is different from the second modified version
      creating a dummy almanac;
      comparing the dummy almanac with the first and second modified versions;
      selecting, based on the comparison, one of the first and second modified versions as a suspect master almanac, wherein the selected master almanac has a higher degree of similarity to the dummy almanac compared to the non-selected master almanac; and
      invalidating the suspect master almanac.

2. The system of claim 1, wherein the operations further comprise:
   storing one or more master almanacs in an almanac repository.

3. The system of claim 1, wherein the operations further comprise:
   determining whether the first time interval has elapsed, wherein the shifting includes in response to a determination that the first time interval has elapsed, shifting a first instance of the set of instances from a first server of the first set of servers to a second server of the second set of servers and shifting a second instance of the set of instances from a third server of the first set of servers to a fourth server of the second set of servers.

4. The system of claim 1, further including:
   a client registry that stores the list of clients registered with the service, wherein the operations further comprise:
   identifying the master almanac to which the service is assigned.

5. The system of claim 4, wherein the operations further comprise:
   identifying a third set of servers as members of a service shifting group that are candidate hosts for the service; and
   selecting a first subset of the third set of servers to include in the first modified version of the master almanac; and
   selecting a second subset of the third set of servers to include in the second modified version of the master almanac, wherein the first subset is different from the second subset.

6. The system of claim 4, wherein the operations further comprise:
   detecting that one or more servers is overloaded during one or more time intervals, wherein creating the dummy almanac includes creating a dummy almanac based on the detected one or more servers overloaded during the one or more time intervals.

7. The system of claim 6, wherein the operations further comprise:
   identifying a suspect service to which the suspect master almanac is assigned;
   obtaining a new master almanac that indicates one or more new conditions that shifts one or more instances of the service to another set of servers;
   assigning the new master almanac to the suspect service;

identifying a suspect client associated with the suspect master almanac; and sending a modified version of the new master almanac to a set of clients registered with the suspect service, wherein the set of clients does not include the suspect client.

8. The system of claim 1, wherein the service is an enterprise service.

9. A method of dynamically shifting one or more instances of a service from a first set of servers to a second set of servers, comprising:

deploying a set of instances of a service on a first set of servers;

assigning a master almanac to the service, the master almanac including a first record and a second record, the first record including a first time interval specifying when the set of instances will be deployed on the first set of servers, and the second record including a second time interval specifying when the set of instances will be deployed on a second set of servers;

distributing the master almanac to a list of clients registered with the service, the list of clients including a first client and a second client;

shifting, based on the master almanac, one or more instances of the set of instances from the first set of servers to the second set of servers;

sending a first modified version of the master almanac to the first client; and sending a second modified version of the master almanac to the second client, wherein the first modified version is different from the second modified version creating a dummy almanac;

comparing the dummy almanac with the first and second modified versions;

selecting, based on the comparison, one of the first and second modified versions as a suspect master almanac, wherein the selected master almanac has a higher degree of similarity to the dummy almanac compared to the non-selected master almanac; and invalidating the suspect master almanac.

10. The method of claim 9, wherein the first time interval is different from the second time interval.

11. The method of claim 9, wherein the master almanac specifies that if a threshold number of requests is received within a third time interval by an instance of the set of instances, the instance will be shifted to another server.

12. The method of claim 9, wherein a client registry stores the list of clients.

13. The method of claim 12, further including:

detecting that one or more servers is overloaded during one or more time intervals, wherein creating the dummy almanac includes creating a dummy almanac based on the detected one or more servers overloaded during the one or more time intervals.

14. The method of claim 13, further including:

identifying a suspect service to which the suspect master almanac is assigned;

obtaining a new master almanac that indicates one or more new conditions that shifts one or more instances of the service to another set of servers; and assigning the new master almanac to the suspect service.

15. The method of claim 14, further including:

identifying a suspect client associated with the suspect master almanac; and sending a modified version of the new master almanac to a set of clients registered with the suspect service, wherein the set of clients does not include the suspect client.

16. The method of claim 9, wherein the shifting one or more instances includes deploying an instance of the set of instances to a server of the second set of servers and undeploying the instance from a server of the first set of servers.

17. The method of claim 16, wherein the shifting one or more instances includes determining whether the instance has completed processing its requests, wherein the undeploying the instance includes when it is determined that the instance has completed processing its requests, undeploying the instance.

18. The method of claim 9, further including:

registering the first and second sets of servers as members of a service shifting group that are candidate hosts for the service.

19. A non-transitory machine-readable medium comprising a plurality of machine-readable instructions that when executed by one or more processors is adapted to cause the one or more processors to perform a method comprising:

deploying a set of instances of a service on a first set of servers;

assigning a master almanac to the service, the master almanac including a first record and a second record, the first record including a first time interval specifying when the set of instances will be deployed on the first set of servers, and the second record including a second time interval specifying when the set of instances will be deployed on a second set of servers;

distributing the master almanac to a list of clients registered with the service, the list of clients including a first client and a second client;

shifting, based on the master almanac, one or more instances of the set of instances from the first set of servers to the second set of servers;

sending a first modified version of the master almanac to the first client; and sending a second modified version of the master almanac to the second client, wherein the first modified version is different from the second modified version creating a dummy almanac;

comparing the dummy almanac with the first and second modified versions;

selecting, based on the comparison, one of the first and second modified versions as a suspect master almanac, wherein the selected master almanac has a higher degree of similarity to the dummy almanac compared to the non-selected master almanac; and invalidating the suspect master almanac.

20. The non-transitory machine-readable medium of claim 19, wherein the list of clients includes a first client and a second client, the method further including:

identifying the master almanac to which the service is assigned;

detecting that one or more servers is overloaded during one or more time intervals, wherein creating the dummy almanac includes creating the dummy almanac based on the detected one or more servers overloaded during the one or more time intervals;

identifying a suspect service to which the suspect master almanac is assigned;

obtaining a new master almanac that indicates one or more new conditions that shifts one or more instances of the service to another set of servers;

assigning the new master almanac to the suspect service;
identifying a suspect client associated with the suspect master almanac; and
sending a modified version of the new master almanac to a set of clients registered with the suspect service, wherein the set of clients does not include the suspect client.

* * * * *